United States Patent [19]
Köethmann

[11] 3,959,639
[45] May 25, 1976

[54] CALCULATING UNIT FOR SERIAL MULTIPLICATION INCLUDING A SHIFT REGISTER AND CHANGE-OVER SWITCHING CONTROLLING THE TRANSMISSION OF THE MULTIPLICAND BITS TO FORM THE PRODUCT

[75] Inventor: Wolfgang Köethmann, Feldafing, Germany

[73] Assignee: Siemens Aktiengesellschaft, Berlin & Munich, Germany

[22] Filed: Sept. 12, 1974

[21] Appl. No.: 505,495

[30] Foreign Application Priority Data
Sept. 13, 1973 Germany............................ 2346188

[52] U.S. Cl. ............................................... 235/164
[51] Int. Cl.[2]............................................. G06F 7/52
[58] Field of Search ..................................... 235/164

[56] References Cited
UNITED STATES PATENTS

| | | |
|---|---|---|
| 3,456,098 | 7/1969 | Gomez et al........................ 235/164 |
| 3,610,907 | 10/1971 | Taylor................................. 235/164 |
| 3,617,723 | 11/1971 | Melvin................................ 235/164 |
| 3,805,043 | 4/1974 | Clary .................................. 235/164 |

Primary Examiner—David H. Malzahn
Attorney, Agent, or Firm—Hill, Gross, Simpson, Van Santen, Steadman, Chiara & Simpson

[57] ABSTRACT

In the case of a calculating unit for serial multiplication of a binary multiplicand with a binary multiplier, the multiplicand is inserted into a shift register in serial form. The development of the product is achieved by suitably providing change-over switches at positions of the shift register conforming to binary ones of the multiplier. The product is filled with the sign digit to the required number of digits by the change-over switches which then connect the output with a sign register.

18 Claims, 44 Drawing Figures

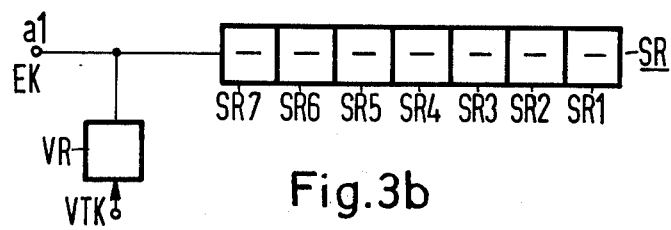
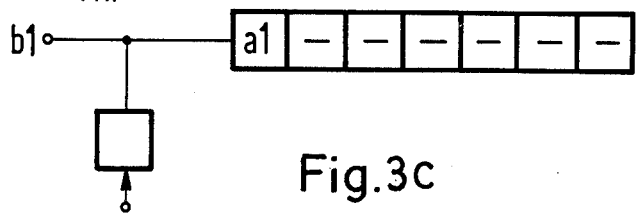
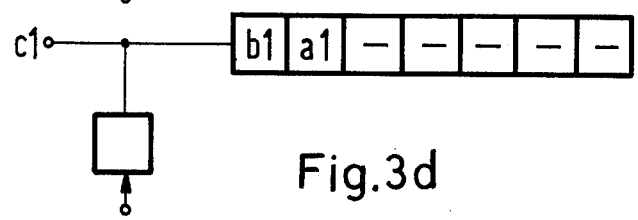
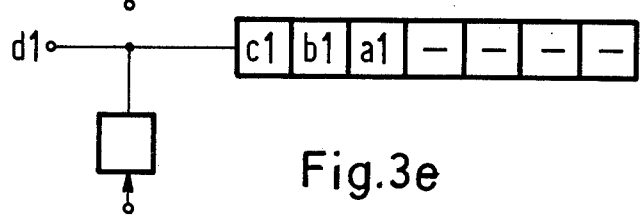
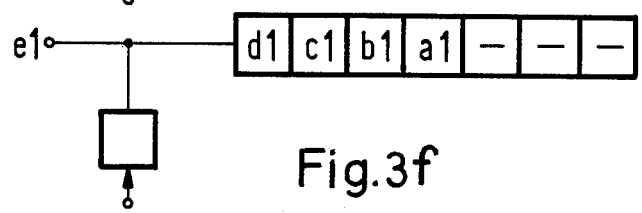
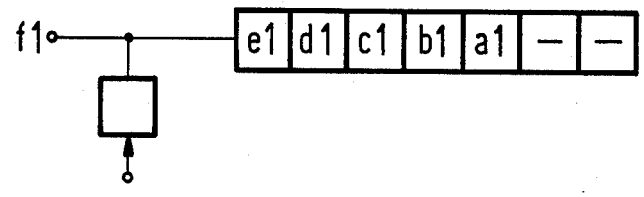

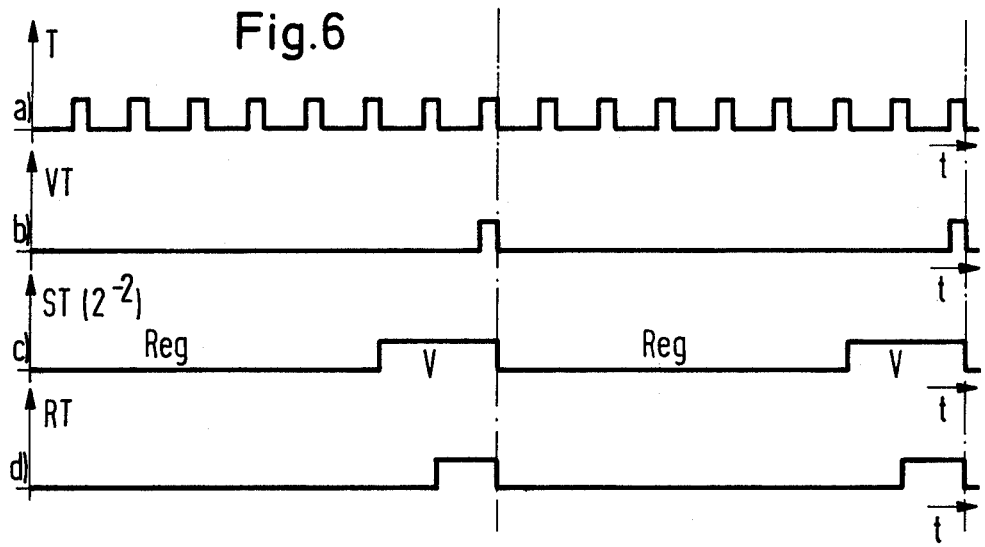
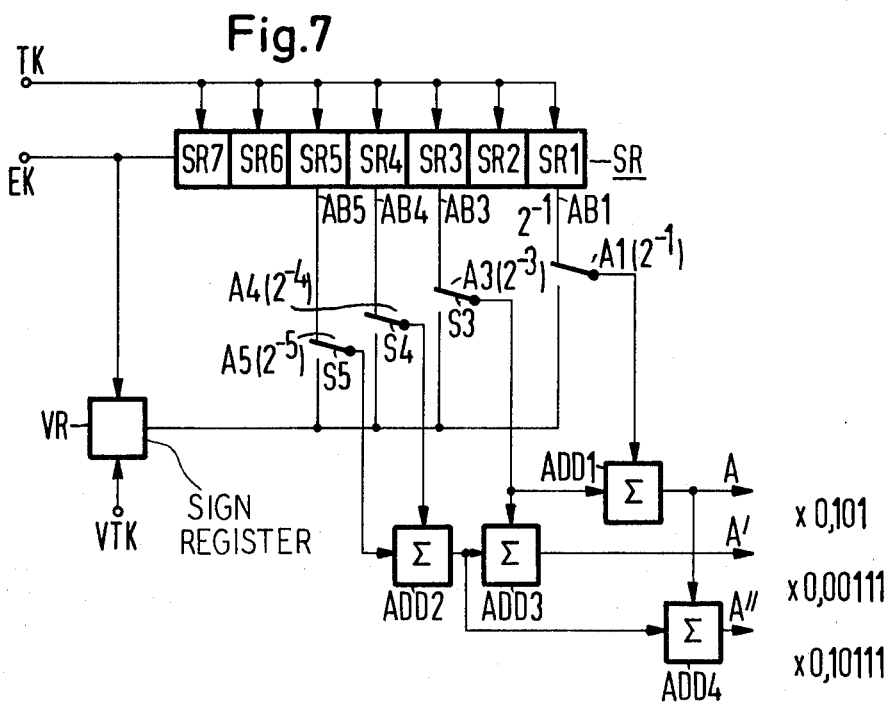

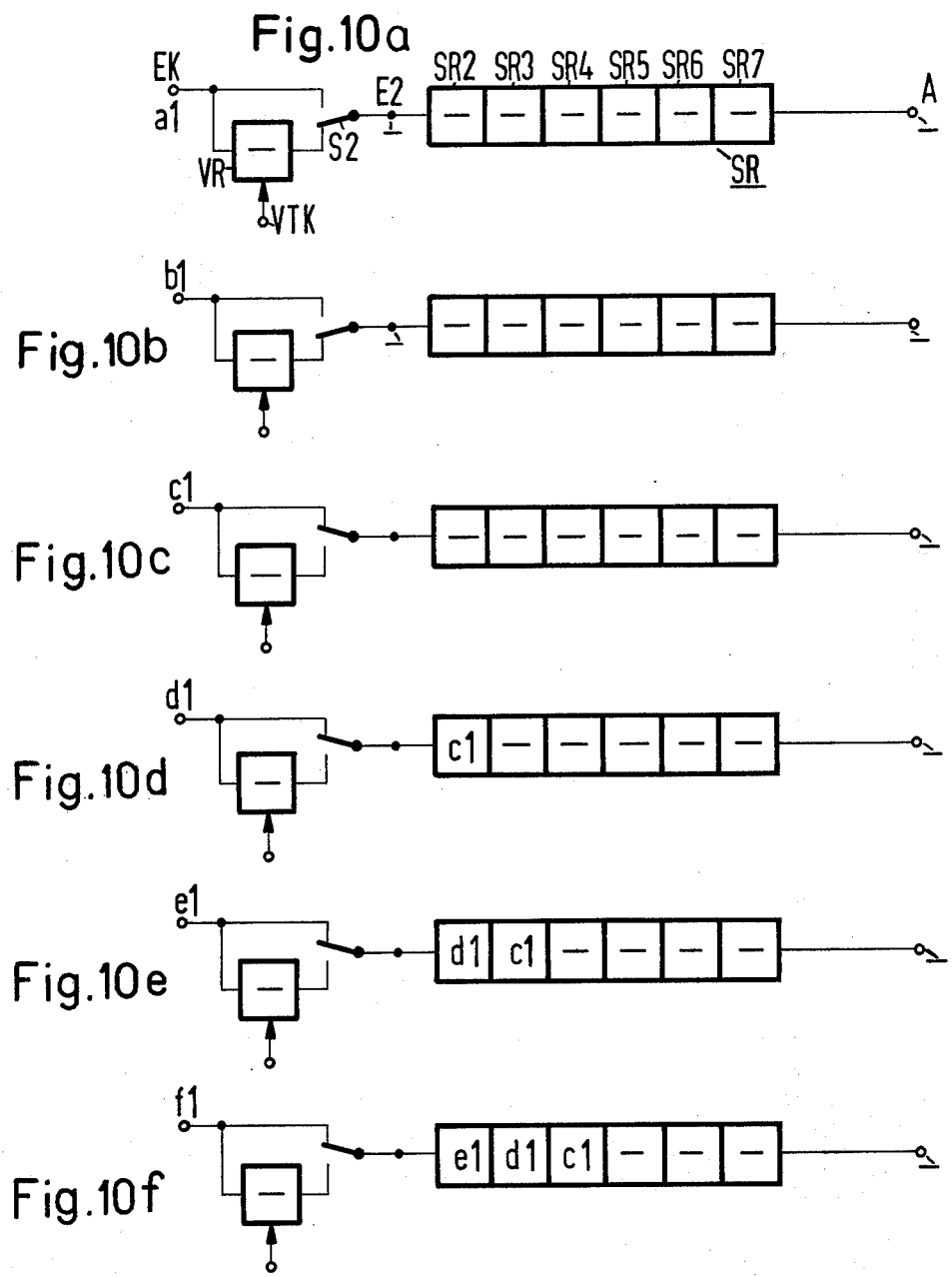

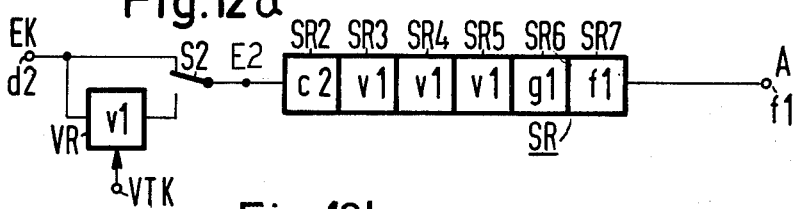
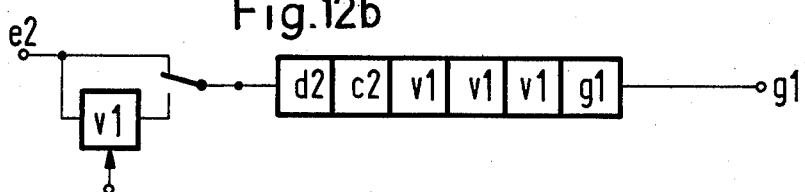
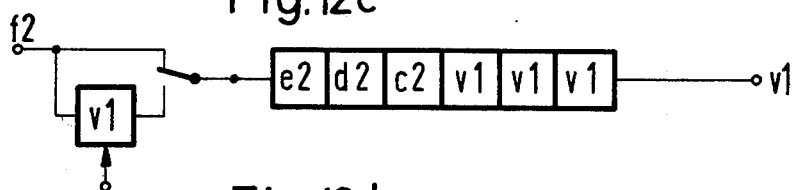
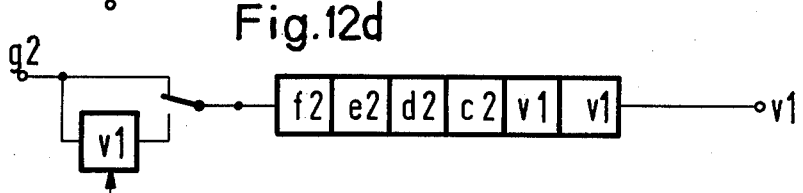
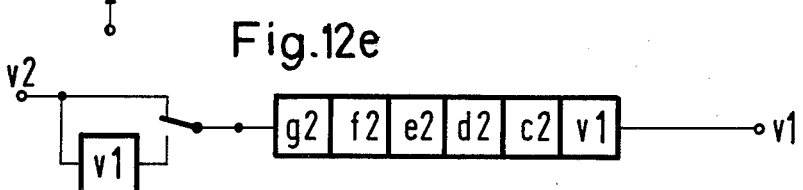
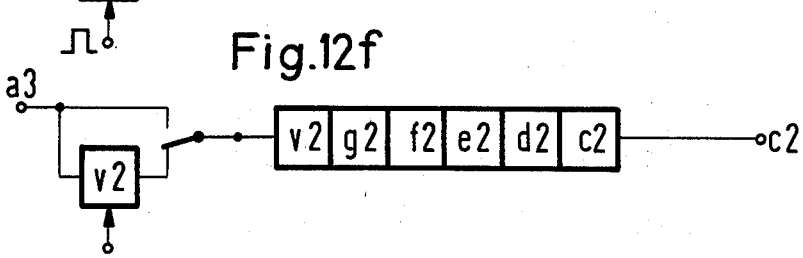

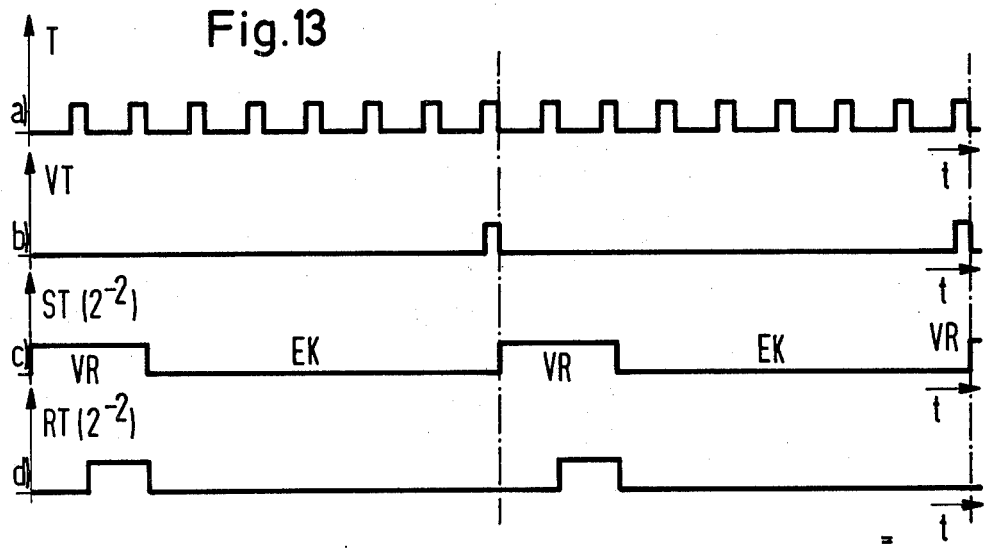
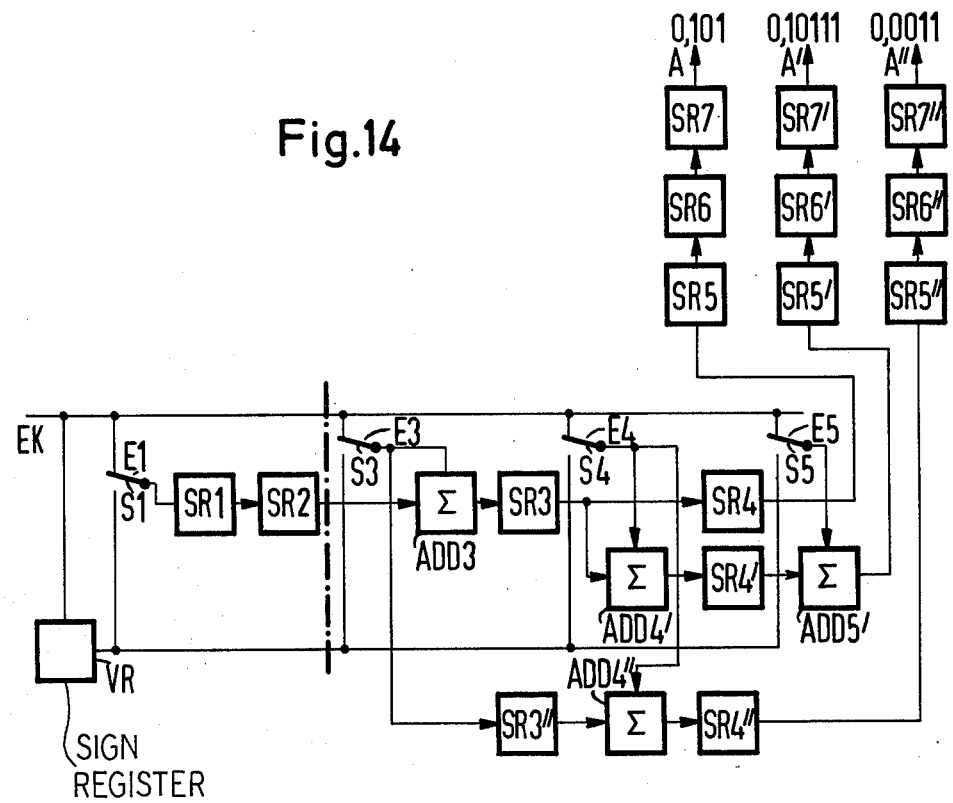

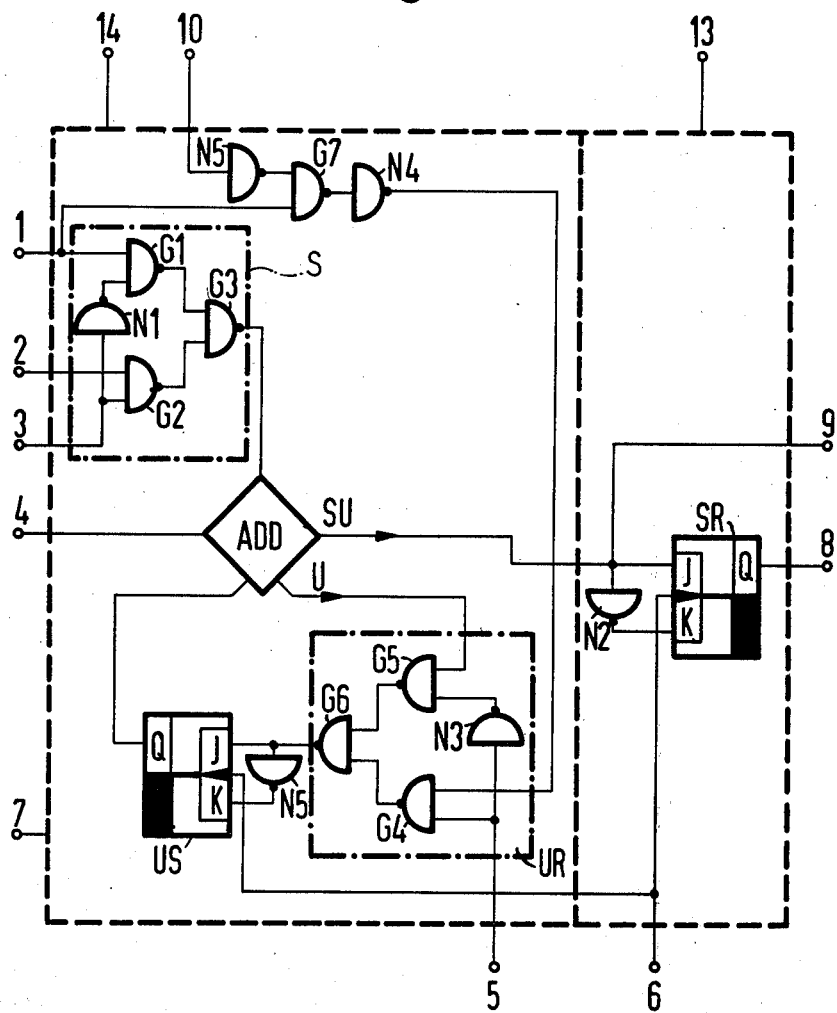

CALCULATING UNIT FOR SERIAL MULTIPLICATION INCLUDING A SHIFT REGISTER AND CHANGE-OVER SWITCHING CONTROLLING THE TRANSMISSION OF THE MULTIPLICAND BITS TO FORM THE PRODUCT

BACKGROUND OF THE INVENTION

The invention relates to a calculating unit for serial multiplication of a binary multiplicand with a binary multiplier.

The problem of multiplying different multiplicands with fixed multipliers arises in the processing of digital values. One example is the digital filter in which value sequence taken from a continuous signal and obtained by quantizing are subjected to arithmetical operations, such as addition, subtraction and multiplication with constant factors. Exemplary embodiments of such filters are represented for example in "Nachrichtetechnische Zeitschrift" June 1972, p. 289–298.

For the execution of serial multiplication, multiplier units are known (IEEE Transactions Vol. AU 16, 1968, No. 3 p. 413–421) in which a flip-flop chain is arranged in the input line for the multiplicand. The adders directly follow one another. The lower inputs of the adders are blocked in a specific time sequence by additional pulses which must be specially produced. As a consequence the lower product digits are suppressed actually during the calculation of the intermediate results. The multiplicands can directly follow one another without disturbing the product formation. It is not possible to change factors after each multiplicand is input. In the case of large numbers of bits the lining up of the full adders directly next to one another produces long transit times which limit the maximum operating frequency of the calculating unit. The upper frequency limit can only be extended by the interposition of individual flip-flops for the purpose of transit time coupling and the product appears one word length later.

Although the described multiplier unit can be employed universally since each arbitrary actor <|1| can be set with the accuracy of the given bit digits, the material outlay is very great.

Furthermore an earlier German Offenlegungsschrift No. 22 14 257 proposes a calculating unit for the execution of multiplications, in which an incoming shift register is provided to receive the multiplicand bits incoming in serial form. On the arrival of a control pulse said bits are transferred in parallel into an output shift register. At the storage cells at which the associated multiplier exhibits a binary one the output shift register is provided with tappings, wherein the course from the higher value to the lower value digits of the multiplicand is selected to be the reverse. Then at the $k$-th tapping, the product $2^{-k}$ times the multiplicand is present in serial form and can possibly be further processed in adder chains.

However on account of the complexity of their circuits, the shift register (preferably JK flip-flops) which are employed are elements which exhibit a high electrical power loss. If possible they should be in as small a number as possible. Also, for the parallel transfer of the bits of the multiplicand from the input-into the output register a transfer pulse train is employed which falls precisely between two pulses of the shift pulse train. The time available for the lowest value bit of the multiplicand is shortened for the following further processing (addition of the sub-products) so that at higher processing speeds calculating errors may occur. As the same pulse is also used to input the rounding bit into the carry store of the adders, only a very short processing time is available for the rounding bit.

The following adder chains require, for the addition of the subproducts, fine transit times which limit the maximum bit sequence, in particular in the case of a number of added sub-products without pulse-train-synchronous decoupling by means of interposed storage flip-flops.

SUMMARY OF THE INVENTION

The aim of the invention is to reduce the outlay for digital, serial-operating multiplier units, and at the same time to achieve higher processing speeds and low error rates. In accordance with the invention which relates to a calculating unit of the type described in the preceding section, this is achieved in that a sign register is provided in which the sign of the multiplicand is input, that a shift register is provided, which is arranged at the input of the calculating unit and into which the multiplicand is input in serial form, that the shift register is provided with tappings at those storage cells in which the associated multiplier exhibits a binary one, wherein the sequence from the higher value to the lower value digits of the multiplier is selected to be the reverse to the sequence of the values of the multiplicand digits, that each of these tappings is assigned its own change-over switch and an individual output, and that assuming that the multiplicand has a number of digits (including sign) N, the $k$-th changeover switch which is assigned to the binary digit of the multiplier which has the digit value $2^{-k}$ connects the $k$-th output to the $k$-th tapping during the first $N-k$ calculating pulses of the multiplication cycle, and connects the $k$-th output to the output of the sign register during the remaining $k$ calculating pulses of the multiplication cycle.

The aim can also be realized in that in a calculating unit of the type described in the section on the background of the invention, a sign flip-flop is provided into which the sign of the multiplicand is input, that a shift register is provided which is arranged at the output of the calculating unit and into which the multiplicand is input in serial form, that the shift register is interrupted (apart from the first storage cell) and provided with parallel inputs at those storage cells where the multiplier exhibits a binary one, wherein the sequence from the higher value to the lower digits of the multiplier is selected to be of the same direction as the trend of the values of the digits of the multiplicand, that each input is assigned its own changeover switch, that when the multiplicand has N digits (including sign) the $k$-th changeover switch which is assigned to the binary digit of the multiplier having the value $2^{-k}$ connects the $k$-th input to the sign register during the first $k$ calculating pulses of the N-pulse train multiplication cycle and connects it to the input during the N-$k$ remaining multiplication pulses, and that at each interruption point an adder element links the output of the preceding storage element to the associated input and passes on the result to the following storage element.

In both cases the use of the simple change-over switch means that no second shift register is required. A high processing speed is possible. Also the liability to errors is reduced. It is thus possible to carry out the serial multiplication rapidly and reliably.

A preferred field of use for such calculating units is in digital filters i.e. devices in which scanning specimens of a signal in digitalized form must be multiplied with likewise digitalized multipliers, in order to achieve a desired filter characteristic. Digital filters of this kind may be used with particular advantage in radar devices, in particular pulsed radar devices in which for example as Doppler filters, integration low-pass filters or filters with variable pass characteristics, they can be used to gate out interferences.

The advantages of the invention and its further development will now be explained in detail making reference to the drawings.

BRIEF DESCRIPTION OF THE DRAWINGS

FIGS. 3, 4 and 5 (consisting of FIGS. 3a–3f, 4a–4f, and 5a–5f) show the state plan of the shift register, of the change-over switches and of the sign register;

FIG. 6 (consisting of waveforms a through d) shows a control pulse plan for a multiplication calculating unit with shift register arranged at the input, and designed for producing the operation illustrated in FIGS. 3–5;

FIG. 7 shows a multiplication calculating unit with shift register arranged at the input and following adders for the realization of products with more than one binary one in the multiplier;

FIGS. 10, 11 and 12 (consisting of FIGS. 10a–10f, 11a–11e, and 12a–12f) illustrate the state plan of the change-over switches, of the sign register and of the shift register during two multiplication cycles.

FIG. 13 (consisting of waveforms a through d) shows the control pulse plan for a multiplication calculating unit with shift register arranged at the output and designed for producing the operation indicated in FIGS. 10–12;

FIG. 14 illustrates a multiplication calculating unit with shift register arranged at the output, and with multiple exploitation of change-over switches and the use of intermediate results in the case of a plurality of multipliers; and finally FIG. 15 shows a universally employable module for the construction of a multiplication calculating unit.

DETAILED DESCRIPTION OF THE ILLUSTRATED EMBODIMENTS

Figure 1:
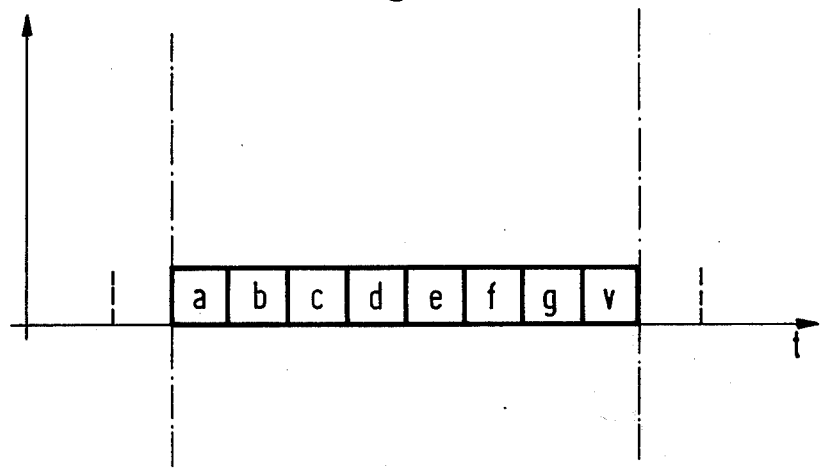
FIG. 1 shows the time plan of the arrival of the multiplicand digits.

FIG. 1 shows the time diagram of the bit sequence of the multiplicand which occurs in the case of serial multiplication. In the represented example, the multiplicand is to consist of seven bits, which are here referenced $a, b, c, d, e, f, g$. The first bit to arrive is the bit $a$ which corresponds to the least significant bit of the multiplicand, and then follow the remaining bits up to the most significant bit $g$. Subsequently the sign bit $v$ appears, where a binary zero corresponds to a positive multiplicand and a binary one corresponds to a negative multiplicand.

Figure 2:
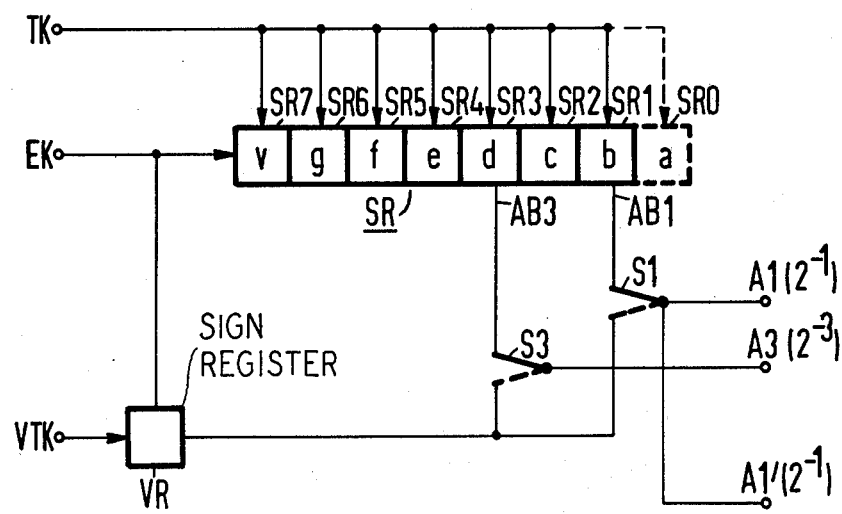
FIG. 2 shows a multiplication calculating unit with shift register arranged at the input, and with multiple tappings and changeover switches.
Figure 4A:
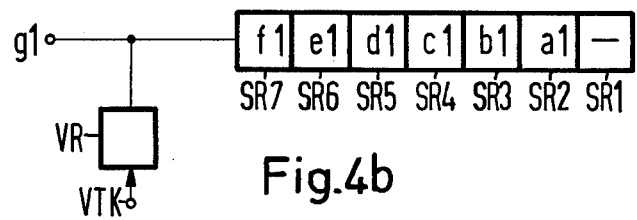
Figure 4B:
Figure 4C:
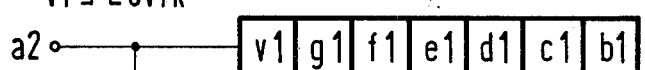
Figure 4D:
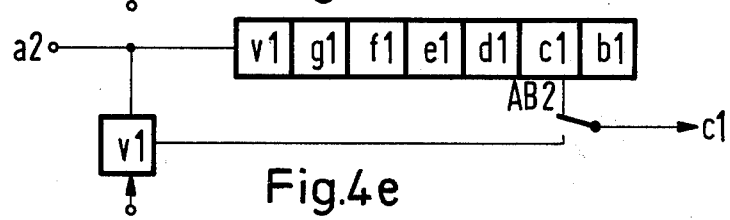
Figure 4E:
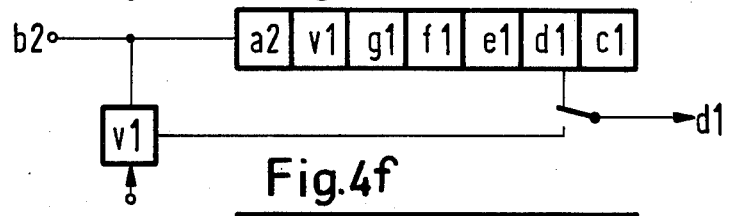
Figure 4F:
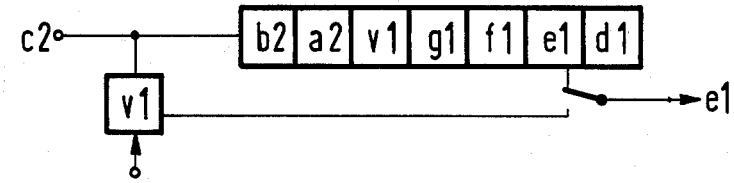

FIG. 2 shows a multiplication calculating unit with a shift register SR arranged at the input. This shift register SR consists of the storage cells SR7, SR6, . . . ,SR0. The storage cell SR7 is connected to the input terminal EK of the multiplication calculating unit, and also connected to the input terminal EK is a sign register VR. This is necessary for example in the case of digital filters because in these positive and negative coefficients (factors) can occur. The binary characters of the multiplicand occur at the input terminal EK in the time sequence described in HG. 1, and are input into the shift register SR under the control of a calculating pulse train T which occurs at the terminal TK. Also a pulse train generator makes available a sign pulse train VT at the terminal VTK which pulse train VT inputs the sign into the sign register VR in synchronism with the latter's arrival. When the multiplicand has been stored, the least significant bit $a$ is thus contained in the storage cell SR0. The sign $v$ of the multiplicand is stored in the storage cell SR7 and in the sign register VR.

At those storage cells SR3, SR1 at which the associated multiplier exhibits a binary one, the shift register SR is provided with tappings AB3, AB1. It is of particular significance that the sequence of the values of the multiplicand digits should be selected to be opposed to the value sequence of the multiplier digits. If for example at the beginning of the multiplication, the storage cell SR0 contains the least significant bit a, a tapping AB0 imagined to exist at this point would correspond to a multiplier digit having the value $2^0$, and would be the most significant digit of the multiplier. As the multiplicand is shifted in the register SR, all the binary characters apart from the bit $a$ occur in serial fashion at the tapping A B1. This means a shift to the right by one digit and thus a multiplication by the factor $2^{-1}$ if it is ensured that after the arrival of the sign bit v at the tapping AB1 the multiplicand is topped up to its original number of digits. This function is performed by change-over switches S1 and S3 which connect the outputs A1 and A3 to the sign register VR during the last ($k=1$) calculating pulse and during the last three ($k=3$) calculating pulses respectively. As the multiplicand, including sign, has eight digits, during the first seven ($N-k=8-1=7$) calculating pulses the switch S1 connects the output A1 to the tapping AB1 and during the ($k=1$) last calculating pulse the switch S1 connects the output A1 to the sign register VR and the change-over switch S3 connects the output A3 to the tapping AB3 during the first five ($N-k=8-3=5$) calculating pulses and to the sign register VR during the last three ($k=3$) calculating pulses. Thus the product multiplicand $\times 2^{-1}$ appears at the output A1 and the product multiplicand $\times 2^{-3}$ appears at the output A3.

If the multiplicand which occurs at the input EK is to be multiplied with a plurality of multipliers, and if binary ones appear at several multiplier digits of equal value, only one tapping and one changeover switch must be provided for each of these common multiplier digits. In the represented example the product multiplicand $\times 2^{-1}$ is to be required twice. Tapping AB1 and change-over S1 are provided only once, and the change-over switch S1 is now assigned the outputs A1 and A1' for the two multipliers. Naturally all the storage cells, commencing from the storage cell SR0 to the first storage cell provided with a tapping, —thus in the selected example the storage cell SR0 shown in broken lines-can be omitted since they are of no significance for the functioning of the multiplication.

Figure 5A:
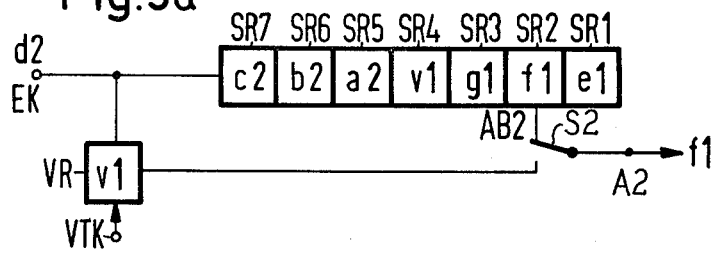
Figure 5B:
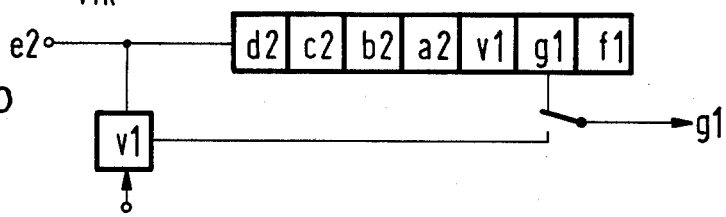
Figure 5C:
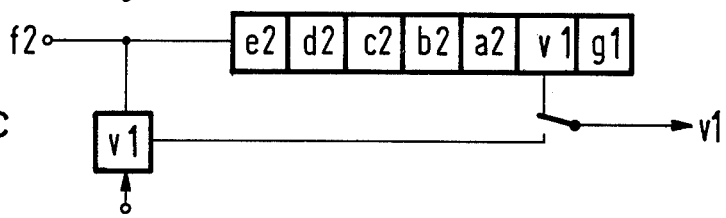
Figure 5D:
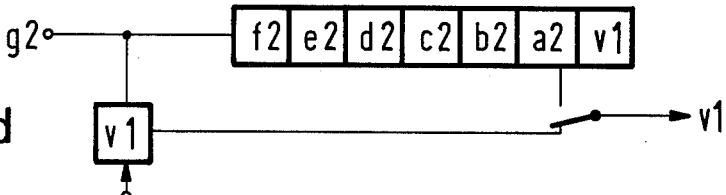
Figure 5E:
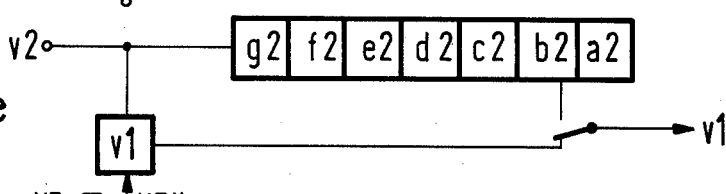
Figure 5F:
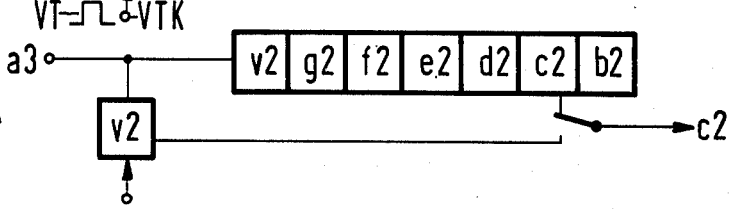

FIG. 3 and the first three rows of FIG. 4 (FIGS. 4a–4c) are to illustrate the input of the multiplicand into the shift register SR and into the sign register VR. To improve the clarity of lay-out, the references have in each case been entered only in the first row (FIGS. 3a, 4a and 5a) of the Figures. At the input EK occur successively the binary digits of an eight-digit multiplicand (including sign), these being referenced a1, ..., g1, v1.

In the individual rows (FIGS. 3a–3f and 4a–4f) of FIG. 3 and FIG. 4 it can be seen how the multiplicand is advanced through all the storage cells. Simultaneously with the eighth shift pulse a sign pulse VT is made available with which the sign v1 is transferred into the sign register VR (FIG. 4, second row i.e. FIG. 4b). As shown in the third row of FIG. 4 (FIG. 4c), following the eighth pulse — the last of the multiplication cycle — the multiplicand, including the sign, is contained in the shift register SR and the sign is also contained in the sign register VR.

FIG. 4, row 4 to 6 (FIGS. 4d–4f) and FIG. 5 illustrate the output of the product, multiplicand $\times 2^{-2}$, and the simultaneous input of the following multiplicand into the shift register SR. In order to achieve the desired multiplication with the factor $2^{-2}$ the storage cell SR2 is provided with a tapping AB2. During the first six ($N-K=8-2=6$) calculating pulses, the change-over switch S2 connects the tapping AB2 to the output A2 (FIG. 4, rows 4 to 6 FIGS. 4d–4f, and FIG. 5, row 1 to 3, FIGS. 5a–5c). After the sixth calculating pulse the change-over switch S2 switches over and now, during the last two ($k=2$) calculating pulses connects the output A2 to the sign register VR. During the output of the multiplicand the next multiplicand is already being input into the shift register SR (indicated by a2, b2, c2 ... g2, v2). The last row of FIG. 5 (FIG. 5f) shows the state following the last pulse of the multiplication cycle for the first multiplicand a1 ... v1. The changeover switch S2 now connects the output A2 to the tapping AB2 once more.

FIG. 6 illustrates the pulse diagram of the multiplication calculating unit with input-end shift registers and is correlated with the example of FIGS. 3–5. Perpendicular dash-dot lines mark the beginning and the end of each multiplication cycle. Row a (FIG. 6a) shows the time sequence of the calculating pulse train T. In each case N equidistant pulses (N=number of binary characters of the multiplicand, including sign) — in the selected example eight pulses — form the multiplication cycle. The calculating pulse train T serves to control the advance of the binary characters of the multiplicand through the shift register SR.

Row b (FIG. 6b) illustrates the pulse train for the input of the sign into the sign register VR. As represented in FIG. 1, the sign of the multiplicand is the last of the binary characters of the multiplicand to arrive. Accordingly, simultaneously with the last calculating timing pulse, the pulse of the sign pulse train VT must be made available, this serving to control the transfer of the sign into the sign register VR.

Row c (FIG. 6c) represents the control pulse ST which serves to switch over the change-over switch S. This pulse train is dependent upon the multiplier which is to be realized. It will be assumed that the change-over switch S2 is to realize the multiplier $2^{-k}$, in the selected example $2^{-2}$. For this purpose the change-over switch S2 (FIG. 5a) connects the output A2 during the first N-k, in the present example six (8–2=6) calculating timing pulses to the tapping AB 2 and during the last $k$, in the present example two, calculating timing pulses to the sign register VR.

FIG. 7 illustrates how the multiplication is carried out with a plurality of multipliers each having more than one binary 1.

Shift register SR, sign register VR and the change-over switches S1 and S3 correspond to those in the multiplication circuit of FIG. 2. The storage cell SRO has been omitted because it is not required for the multiplication. Also the shift register SR is provided at the storage cells SR5, SR4 with the tappings AB5, AB4, and two change-over switches S4, S5 are provided which connect the outputs A4, A5 to the tappings AB4, AB5 or to the sign register. At outputs A1, A3, A4 and A5 appear the products multiplicand $\times 2^{-1}$, multiplicand $\times 2^{-3}$, multiplicand $\times 2^{-4}$, and multiplicand $\times 2^{-5}$, respectively.

If, for example the multiplier $0.101 = 2^{-1} + 2^{-3}$ is to be realized, the outputs A1 and A3 are connected by the ADD1 whose output simultaneously represents the output A of this multiplication circuit.

In order to carry out the multiplication with the multiplier $0.0111 = 2^{-3} + 2^{-4} + 2^{-5}$, the results of the outputs A4 and A5 are added in the adder ADD2 and this intermediate sum is added in the adder ADD3 to the result of the output A3. At the output of the adder ADD3 which simultaneously represents the output A' of the multiplication circuit, there then appears the desired product. The output A3 can thus be advantageously employed to realize the multiplier 0.101 and the multiplier 0.00111.

In order to realize the multiplier $0.1011 = 2^{-1} + 2^{-3} + 2^{-4} + 2^{-5}$, one could combine the outputs A4 and A5 in an adder, add to this result of the output A3, and add this intermediate sum to the result of the output A1. For this purpose three adder elements are required. The multiplier 0.10111 agrees with the multiplier 0.101 in its first for digits which exhibit two binary ones, and also agrees in the two last digits with the multiplier 0.00111. Thus the result of the adder ADD2 which connects the outputs A5 and A4 is expediently added to the result of the adder ADD1 which connects the outputs A1 and A3 and thus two adders are spaced. The results of the adders ADD1 and ADD2 are thus each employed in multiple in different adder arms.

Figure 8:
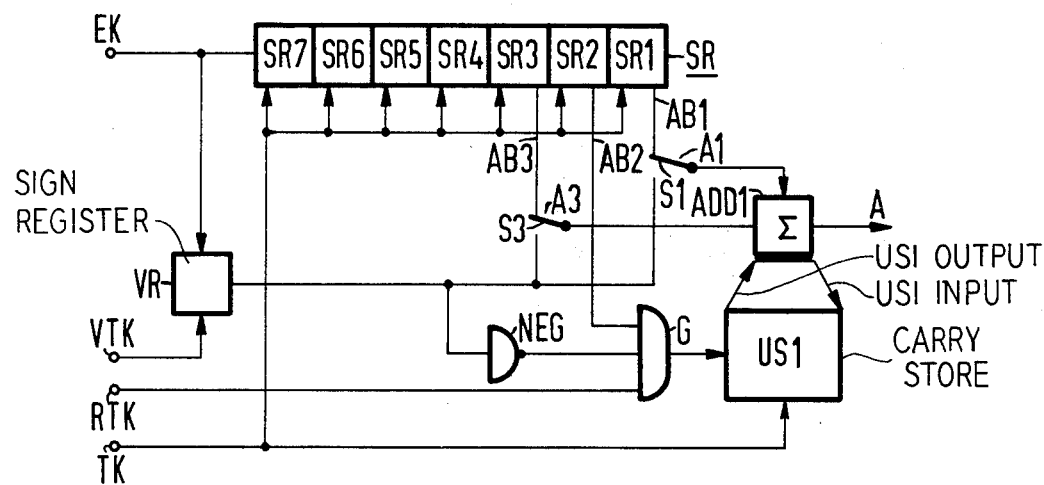
FIG. 8 shows a multiplication calculating unit with shift register arranged at the input and a device serving to reduce rounding errors.

A general rule for the multiplication of an $m$-digit number with an $n$-digit number is that the product has $m + n$ digits. When several multiplications are to be carried out one after another, the required number of digits increases very rapidly. One is compelled to limit the number of digits of the product. When carrying out multiplication with a multiplier which amounts to less than one ($<1$), this is usually carried out by omitting all the digits from a specific value onwards. In the multiplication circuit in accordance with the invention, the number of digits of the product is limited to the number of digits of the multiplicand. In order to keep low the errors occurring as a result of this break-off, roundings are carried out, and that digit which is in each case disregarded, after a tapping, (if the digit is a binary one) is used for rounding off. The carry stores of the adders are also used for this purpose. FIG. 8 represents the multiplier calculating unit described in FIG. 2 and also shown is the carry store of the adder ADD1, here referenced US1. The highest binary digit of the multiplicand to be added in the adder ADD1 is tapped at the storage cell SR3. Thus the bit stored in the storage cell SR2 must be used for rounding. It should also be observed whether the sign register VR contains a binary zero (sign +) or a binary 1 (sign −). In the case of negative multiplicand the carry stores US1 must have a binary zero at the start of the read-out process. For this reason the output of the sign register VR is connected to a negator NEG, whose output is conducted to a logic AND gate B. A second input of this AND gate G is connected to the tapping AB2 and a third input of the AND circuit is supplied via the rounding pulse train terminal RTK with the rounding pulse train RT. On the arrival of this rounding pulse train RT, when the sign is positive, the binary character stored in the storage cell SR2 is input into the carry store. Like the storage cells of the shift register SR, the carry store US1 is cntrolled by the calculating pulse train T.

In FIG. 6, row d(i.e. FIG. 6d) the time sequence of the rounding pulse RT is plotted. In synchronism with the last (eighth) calculating pulse of the multiplication cycle, the rounding pulse RT controls the transfer of the rounding bit into the carry stores. This rounding pulse RT is independent of the multiplier and can be used to operate all the carry stores.

Figure 9:
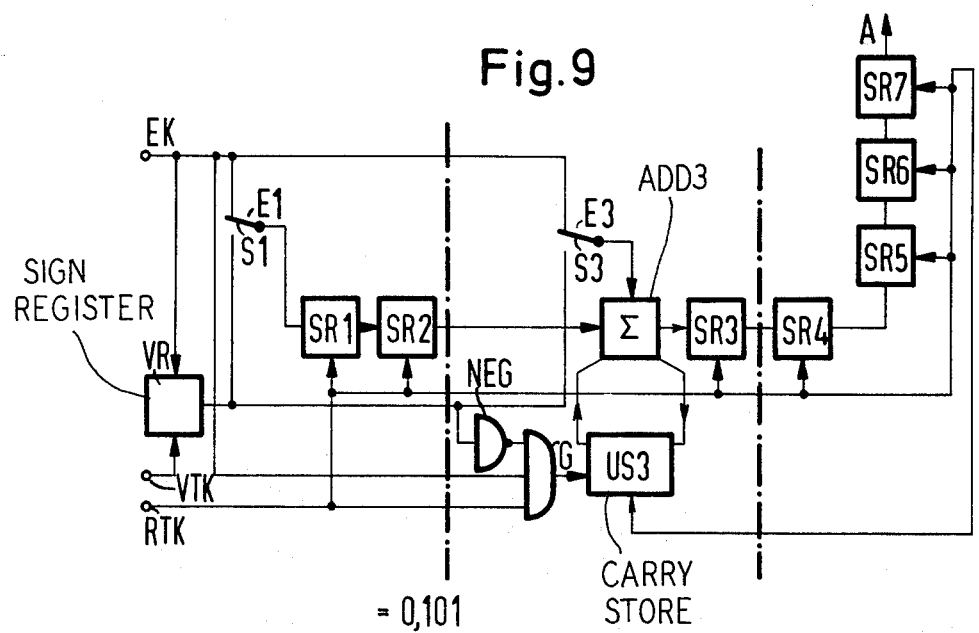
FIG. 9 shows a multiplication calculating unit with shift register arranged at the output, and with devices serving to reduce rounding errors.
Figure 11A:
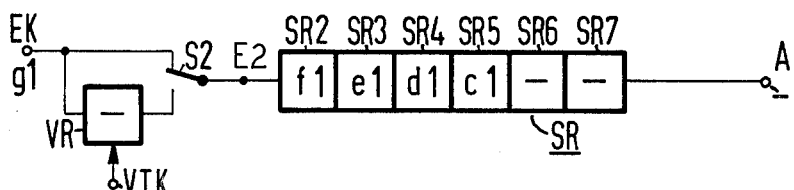
Figure 11B:
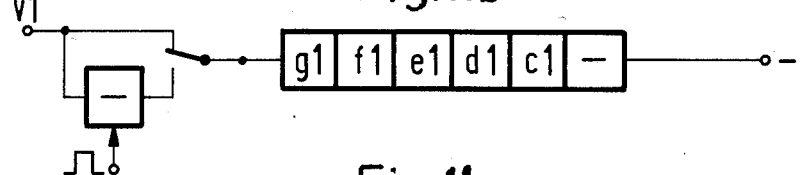
Figure 11C:
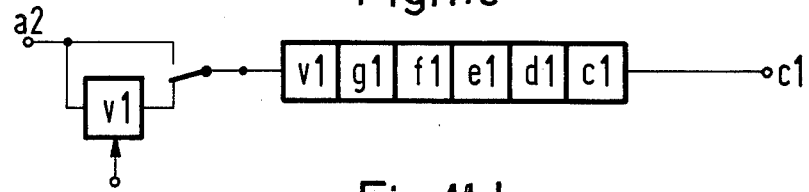
Figure 11D:
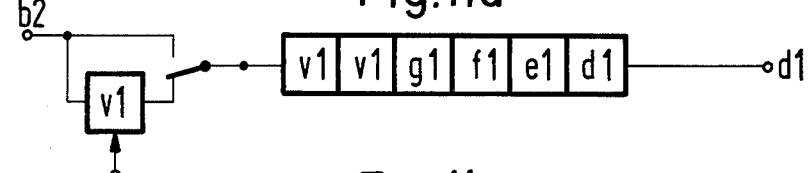
Figure 11E:
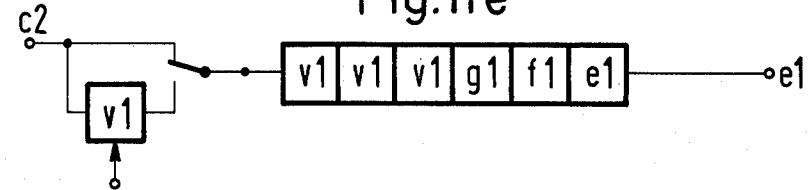

FIG. 9 illustrates a calculating circuit for the serial multiplication of a binary multiplicand with a binary multiplier, the shift register SR being arranged at the output A of the calculating circuit. This shift register consists of N−m storage cells. Here it is assumed that in the multiplier the first binary one occurs as the m-th digit after the binary point, and N is again the number of digits of the multiplicand including sign. In the present example the multiplier 0.101 is to be realized, and thus seven ($N - m = 8 - 1 = 7$) storage cells are required, which are referenced SR1, SR2, . . . , SR7. The individual binary digits of the multiplicand arrive at the input terminal EK of the multiplication unit in the manner described in respect of FIG. 1. At those storage positions at which the associated multiplier has a binary one the shift register SR is provided with parallel inputs E1 and E3. Here it is of particular significance that the sequence from the higher value to the lower value digits of the multiplier is to be selected to be the same as the sequence of values of the digits of the multiplicand. Each of the parallel inputs E1, E3 is assigned its own change-over switch S1, S3. The switch S1 connects the input E1 to the sign register VR during the first $Ck = 1$) calculating pulse of the N-pulse train multiplication cycle, and to the input EK during the last ($N-k = 8 - 1 = 7$) calculating pulses. The change-over switch S3 connects the input E3 to the sign register VR during the first three ($k = 3$) calculating pulses and to the input EK during the last five ($N - k = 8 - 3 = 5$) calculating pulses. The storage cell SR1 which is assigned to the highest-value binary one of the multiplier, is directly connected to the input E1. All the other storage cells — in the example SR3— which are assigned a binary 1 of the multiplier — are preceded by an adder — in the example ADD3 — which adds the sub-product of the previous storage cell SR2 and the sub-product from the input E3. The advance of the binary characters through the shift register SR is controlled by the calculating pulse train T. The carry store US3 of the adder ADD3 is used to reduce break-off errors. Instead of the carry from the adders, with the second calculating pulse the binary character (rounding bit) currently arriving at the input terminal EK, is stored into this carry store US3. The input of the rounding bit into carry store US3 is to be omitted in the case of negative multiplicands and for this reason the output of the sign register VR is connected to a negator NEG whose output is conducted to the AND gate G. The second input of the AND gate G is connected to the input terminal EK. A third input of the AND gate G is supplied with the rounding pulse train RT (via terminal RTK). FIG. 13, row d (i.e. FIG. 13d), shows the time sequence of this rounding pulse train. The rounding pulse train is dependent upon the multiplier which is to be realized and can only be used to control the carry store which is assigned to this multiplier.

FIG. 10 and the first three rows of FIG. 11 (i.e. FIGS. 11a –11c) are to illustrate the input of the multiplicand into the shift register SR and into the sign register VR. The realization of a multiplication with the multiplier $2^{-2}$ will be selected by way of example. It is assumed that at the input terminal EK there arrive, in succession, the binary digits of a first eight-digit (including sign) multiplicand, these being referenced $a1, b1, . . . , g1, v1$. The shift register SR consists of N-m, —in the selected example six ($8 - 2 = 6$) — storage cells which are referenced SR2, SR3, . . . , SR7. During the first two calculating pulses the change-over switch S2 connects the input E2 to the sign register VR. The binary characters $a1, b1$ which are input with these two calculating pulses are suppressed, and the contents of the sign register VR is input into the storage cells SR2 and SR3. After the second calculating pulse, the change-over switch S2 switches over and now connects the input E2 to the input terminal EK. Now the binary characters $c1, d1, . . . v1$ are input consecutively into the shift register SR (FIG. 10 , rows 4 to 6 (i.e. FIGS. 10d –10f), FIG. 11, rows 1 to 3 (i.e. FIGS. 11a –11c). Then the change-over switch S2 is reversed and again connects the input E2 to the sign register during the first two calculating pulses of the next multiplication cycle. Thus the first multiplicand is topped up with the sign to its full number of digits. At the same time the first two binary characters of the following multiplicand $a2, b2$ are suppressed (FIG. 11, row 4 and 5, i.e. FIGS. 11d and 11e).

FIG. 12 shows the next output of the first multiplicand and the input of the second.

FIG. 13 shows a pulse diagram correlated with FIGS. 10–12 for the realization of the product multiplicand $\times 2^{-2}$. The beginning and end of each multiplication cycle are again represented by dash-dotted perpendicular lines. In FIG. 13a the time sequence of the calculating pulse train T is plotted. This consists of eight ($N = 8$) equidistant pulses. The calculating pulse train T controls the advance of the binary digits of the multiplicand through the shift register SR. Simultaneously with the arrival of the last pulse of the calculating pulse train, the sign pulse VT must be made available, which latter controls the transfer of the sign of the multiplicand into the sign register VR. This sign pulse train is plotted in row b of FIG. 13 (i.e. FIG. 13b). The calculating pulse train and the sign pulse train can be used to control all the storage cells and sign registers because they are independent of the multiplier which is to be realized. The pulses which control the switch S2 are represented in FIG. 13, row c (FIG. 13C). During the first two ($k = 2$) pulses the change-over switch S2 connects the input E2 to the sign register VR, and during the last $N - k$ calculating pulse trains — in the selected example six ($8 - 2 = 6$) calculating pulses the change-over switch S2 connects the input E2 to the input terminal EK. A general rule is that the k-th change-over switch, which is assigned to that binary digit of the multiplier which has the value $2^{-k}$, connects the $k$-th input to the sign register during the k first calculating pulses and to the input terminal EK during the $N - k$ last calculating pulses of the N- pulse-train multiplication cycle. The rounding pulse RT is plotted in row d of FIG. 13 (i.e. FIG. 13d). This rounding pulse RT controls the selective transfer of the rounding bit into a carry store such as that indicated at US3 in FIG. 9 or at US in FIG. 15. It is always the last suppressed bit of the multiplicand which is used as rounding bit, and therefore in the selected example of FIGS. 10—13 the rounding bit pulse RT coincides in time with the second calculating pulse.

FIG. 4 is to illustrate the multiple exploitation of storage cells, adders, and parallel inputs. For clarity, the pulse train supply lines of the storage cells has been omitted, and also omitted are the carry stores which belong to the adders and serve to accommodate the carry or the rounding bit. The multiplication with the multiplier 0.101 is to be realized in the first multiplication chain which consists of the storage cells SR1, SR2, ..., SR7, the adder ADD3, the change-over switches S1 and S3 and the inputs E1, E3. The mode of operation of the change-over switches of the storage cells and of the adder have already been described in FIG. 9, and the result is produced at the output A. The multiplication with the multiplier 0.10111 is to be realized in the second multiplication chain. For this purpose are also provided the change-over switches S4, S5 and the inputs E4, E5. It will be seen that the first and the second multipliers up to and including the fourth binary digit are identical, and in the second multiplier there are also binary ones at the digits having the values $2^{-4}$ and $2^{-5}$. Advantageously the intermediate result of the first multiplication chain which is present at the output of the storage cell SR3 can be used in the second multiplier chain. Therefore the second multiplier chain consists only of the storage cells SR4', SR5', SR6', SR7' and the adders ADD4', ADD5'. The adder ADD4' connects the storage cell SR3 and the input E4 and the result is conducted to the storage cell SR4'. The adder ADD5' adds the contents of the storage cell SR4' to the binary characters appearing at the input E5. The result in input into the storage cell SR5' and then advanced with each calculating pulse T via the cells SR6' and SR7' to the output A'. The multiplication with the multiplier 0.0011 is to be carried out in the last multiplier chain. Whereas in the case of the first two multipliers the first binary one occurs at the digit which has the value $2^{-1}$, in the case of the third multiplier the first binary one does not appear until the digit $2^{-3}$ and therefore it is not possible to multiply exploit storage cells and adders. Only the change-over switches S3 and S4 which are assigned to the binary digits of the multiplier having the values $2^{-3}$ and $2^{-4}$ and which have already been required to realize the first two multipliers can be used to realize the third multiplier. The inputs E3 and E4 are thus multiply exploited. The input E3 is conducted directly to the input of the storage cell SR3'', whose output is linked in the adder ADD4'' to the input E4, , and the result is advanced through the storage cells SR4'', SR5'', SR6'' and SR7'' to the output A''.

FIG. 15 illustrates a module with which the calculating unit can be constructed in a simple manner. In FIG. 9 perpendicular broken lines indicate which components are to be combined on this module. These are a change-over switch, an adder, an associated carry store, a storage cell and a logic unit which prevents the rounding bit from being input into the carry storage in the case of negative multiplicands.

Firstly the external terminals of the module will be explained. Terminal 1 corresponds to the input terminal EK of the multiplication calculating unit. The output of the sign register is connected to terminal 2 and the control pulse train ST arrives at terminal 3. Terminal 4 is to be connected to the output 8 of the preceding module. The rounding pulse RT is to be connected to terminal 5 and the calculating pulse train T to terminal 6. Earth is connected to terminal 7. Terminal 8 is the output of the storage element with which the calculating pulse train is synchronized. Equal values are also present at the output 9, although not in synchronism with the pulse train. The terminal 10 is also connected to the sign register VR and leads to the logic unit for the suppression of the input of the rounding bit in the event of a negative multiplicand. The terminals 13 and 14 serve to conduct the supply voltges. All the logic functions at S are realized with NAND gates G1, G2, G3 and a negator element N1. At the output of gate G3 appears the result of the following switching function: (Terminal 1 AND Terminal 3) OR (Terminal 2 AND Terminal 3) i.e. when a logic 1 is present at the terminal 3, the terminal 2 is switched through, to the output of the gate G3, and when a logic zero is present at the terminal 3, the terminal 1 is switched through to the output of the gate G3. The adder ADD adds the result which appears at the output of the gate G3 to the result which is produced at the terminal 4. The result SU from the adder ADD is directly switched to the J input of a JK flip-flop SR, and the result SU from the adder ADD which has been negated by the negator N2 is switched to the K-input of the JK flip-flop SR. With this wiring of the inputs the JK flip-flop SR has the following function: With each timing pulse which here appears at the terminal 6, the binary value which stands at the input J of the JK flip-flop SR is stored and appears at the output Q in the very moment of the negative going edge of the timing pulse. The result of the adder is also conducted to the terminal 9 where it can be used for purposes in which it is not necessary to produce values at precisely defined times (asynchronous output). The terminal 10 which exhibits the sign of the multiplicand is conducted to the negator element N5. Its output is conducted to the NAND gate G7 with the following negator element N4. The second terminal of the gate G7 is connected to the terminal 1. Thus a logic zero appears at the output of the negator N4 when a logic one (negative muliplicand) appears at the terminal 10, and when a logic zero appears at the terminal 10 (positive multiplicand) the state at terminal 1 reappears at the output of negator N4. A gate change-over switch UR composed of the NAND gates G4, G5, G6 and the negator element N3 is also provided. When a logic 1 is present at the terminal 5, the result of the negator element N4 is switched through to the output of the gate G6, and when a logic zero is present at the terminal 5 the carry output U of the adder ADD is switched through to the output of the gate G6. This output of the gate G6 is switched to the J-input of the JK flip-flop US which thus represents the carry store of the adder ADD. The result of the gate G6 which has been negated by the negator N5 is switched to the K-input of the flip-flop US. The output Q of the flip-flop US is connected to the third input of the adder ADD.

To provide guide-lines for determining a minimum number of storage cells required in the shift register and adder, it is advantageous to proceed in the following manner:

rounded multipliers is chosen which is closest to the ideal multiplier value.

The table on the following page will summarize the operation of the embodiment of FIGS. 8 and 15.

TABLE SHOWING THE INSERTION OF THE ROUNDING BIT ACCORDING TO FIGS. 8 and 15

| State After TK Pulse Number: | VR | SR7 | SR6 | SR5 | SR4 | SR3 | SR2 | SR1 | A3 | A1 | US1 Output | A | US1 Input |
|---|---|---|---|---|---|---|---|---|---|---|---|---|---|
| 8  | 0 | 0 | 0 | 0 | 1 | 1 | 1 | 1 | 1 | 1 | 1 | 1 | 1 |
| 9  | 0 | 0 | 0 | 0 | 0 | 1 | 1 | 1 | 1 | 1 | 1 | 1 | 1 |
| 10 | 0 | 0 | 0 | 0 | 0 | 0 | 1 | 1 | 0 | 1 | 1 | 0 | 1 |
| 11 | 0 | 0 | 0 | 0 | 0 | 0 | 0 | 1 | 0 | 1 | 1 | 0 | 1 |
| 12 | 0 | 0 | 0 | 0 | 0 | 0 | 0 | 0 | 0 | 0 | 1 | 1 | 0 |
| 13 | 0 | 0 | 0 | 0 | 0 | 0 | 0 | 0 | 0 | 0 | 0 | 0 | 0 |

The absolute values of the multiplier are converted from decimal form into dual form, including only as many digits of the dual form to ensure that the approximated multiplier in decimal form ($\bar{x}$) differs from the output value ($x$) by no more than a given limit s. This conversion must be carried out once without and once with rounding off of the binary-coded value. Then it is observed which of the two values within the given limit lies closest to the output value. When all the multipliers have been established in this way, when a digital filter is concerned, the latter's pole — zero position configuration in the complex z-plane must be determined and from this the resultant transmission function must be determined. In the case of sub-systems at the maximum of the second grade (parallel or cascade form of the digital filter), the former is particularly simple and the latter can be carried out either graphically or — as this is a geometric problem — with the aid of a simple calculating program. It is then possible to estimate whether with the given limit, the approximated transmission function is sufficiently accurate. If not, the given limit must be reduced and the procedure repeated. With factors stipulated in this way in the binary code, the number of adders required is obtained from the number of logic 1 minus 1, and the number of storage cells is obtained from the number of multiplicand digits including sign minus $m$, when the first binary 1 appears at the $m$-th digit after the binary point of the multiplier.

For a calculating unit according to any of the disclosed embodiments, with a given number of available multiplier digits, where two possible multiplier arrangements would represent a given multiplier only approximately, one selects the multiplier valve which differs least from the given multiplier. For example, for the dual multiplier 0.101101 (= 0.703125 in decimal form) are available two rounded values namely the rounded up value 0.1100 (= 0.75 in decimal form) and the rounded off value 0.1011 (= 0.6875 in decimal form). Of these two values is chosen the rounded off value 0.1011 (= 0.6875) since it differs from the not rounded multiplier less (about 0.015625) than the rounded up value 0.1100 (about 0.046875).

When any of the disclosed embodiments is employed as a digital filter, of two approximate multiplier values lying on each side of the given multiplier, one selects that value which in the result filter characteristic produces the least deviation from the desired course. Thus for a given course of a desired filter characteristic, the selection is basically to be made such tht one of two

I claim as my invention:

1. A calculating unit for the serial multiplication of a binary multiplicand and a binary multiplier, comprising
   a calculating unit input for receiving a binary multiplicand having a number of digits N including a sign digit in serial fashion,
   a sign register for storing the sign digit of the multiplicand,
   a shift register connected with the calculating unit input and having a series of storage cells into which the multiplicand is fed in serial fashion in response to a series of calculating pulses of a multiplication cycle,
   said shift register having tappings each representing a respective binary one multiplier digit of the multiplier and being connected with outputs of respective storage cells of said series in accordance with the digit value of the binary one multiplier digit represented thereby such that the tappings representing successively lower value digits of the multiplier are associated with storage cells which represent successively higher value multiplicand digits,
   each of said tappings having an individual changeover switch with an individual switch output, and said switches each having respective switch inputs connected with the sign register and with the associated tapping and said switches being operable during a multiplication cycle to connect the kth tapping with the kth switch output during the first $N$ minus $k$ calculating pulses of the multiplication cycle and to connect the output of the sign register with the kth switch output during the remaining k calculating pulses of the multiplication cycle where the kth switch is assigned to represent the binary one of the multiplier which has the digit value $2^{-k}$.

2. A calculating unit in accordance with claim 1 with said calculating unit input being operable for receiving a binary multiplicand for multiplication by a plurality of binary multipliers, a first of said multipliers and a further one of said multipliers having respective binary ones of the same digit value, said shift register having respective tappings and respective changeover switches corresponding to the respective binary one multiplier digits of the first multiplier, and being connected with respective outputs of respective storage cells of said series in accordance with the respective digit values of the respective binary one multiplier digits of said first multiplier, the respective changeover switches having first multiplier output means for supplying first digit signals in accordance with the first multiplier during a multiplication cycle, at least one of said switches having further multiplier output means for representing the further binary multiplier, and the switch corresponding to the binary one multplier digit of the same digit value as the binary one multiplier digit of the further multiplier having its switch output connected in common to said first and said further multiplier output means.

3. A calculating unit according to claim 1, with the switches representing a given multiplier having multiplier output means for supplying digit signals in accordance with the product of the binary multiplicand supplied to the calculating unit input and the multiplier represented thereby, and having adder means interposed between the switch outputs thereof and said multiplier output means, said adder means comprising one adder with respective inputs connected to respective first and second switch outputs for summing the respective digit signals therefrom, and at least one further adder having its inputs connected respectively to the output of the one adder and to a third one of said switch outputs for supplying the sum of the digit signals from the first, second and third switch outputs.

4. A calculating unit according to claim 1, with said switches having an adder with inputs connected with respective switch outputs for summing respective digit signals therefrom, said adder having a carry store for receiving carry signals from the adder, said carry store being connected with said sign register and being responsive to a rounding pulse arriving with the Nth calculating pulse of said series of calculating pulses and to a positive sign digit stored in said sign register to store a rounding bit so as to reduce rounding errors.

5. A calculating unit according to claim 1, with the switches being operable to represent respective binary one multiplier digits of a plurality of multipliers and having respective multiplier outputs for supplying digit signals in accordance with the products of the multiplicand supplied to said calculating unit input and the respective multipliers, said switches having at least one adder connected with two switch outputs and at least one further adder connected to the output of the one adder and to a further one of said switch outputs and for supplying to one of said multiplier outputs the sum of the digit signals from the two switch outputs and the further one of said switch outputs.

6. A calculating unit according to claim 5, with the switches having respective adder arms interposed between the switch outputs and the respective multiplier outputs and supplying the products of the multiplicand and respective multipliers including two binary one multiplier digits of respective common digit values, said adder arms including at least one common adder having its inputs connected to respective switch outputs of a pair of switches, each of said pair of switches representing the multiplier digits of one of said common digit values.

7. A calculating unit for the serial multiplication of a binary multiplicand and a binary multiplier, comprising
 a calculating unit input for receiving the multiplicand in serial fashion, and a calculating unit output for supplying the product of the multiplier and multiplicand,
 a sign register for storing a sign digit signal in accordance with the sign of the multiplicand,
 a shift register having its output connected to the calculating unit output and having a series of storage cells into which the multiplicand is fed in response to calculating pulses of a calculating pulse train during a multiplication cycle of N calculating pulses,
 said shift register having an adder interposed in the series of storage cells and positioned in the series in accordance with a binary one multiplier digit of the multiplier to be represented thereby,
 a plurality of change-over switches each representing a respective binary one multiplier digit of the multiplier, and having first switch inputs connected in parallel to the calculating unit input, having second switch inputs connected in parallel to the sign register and having respective switch outputs connected with said shift register at positions thereof in accordance with the digit value of the binary one multiplier digit represented thereby, and operable in one switching condition to connect the calculating unit input with the respective switch outputs for supplying digit signals in accordance with the successive digits of the multiplicand to said shift register at positions thereof in accordance with the digit value of the binary one multiplier digit represented thereby, and operable in another switching condition to connect the sign register with the respective switch outputs for supplying digit signals in accordance with the sign digit signal stored by said sign register to the respective positions of the shift register,
 said change-over switches being responsive to respective switch control pulse trains during a multiplication cycle to connect the sign register with the $k$th switch output during the first $k$ calculating pulses of the calculating pulse train where the respective switches represent a binary one multiplier digit of digit value $2^{-k}$, and to connect the calculating unit input to the $k$th switch output during the remaining $N$ minus $k$ calculating pulses of the calculating pulse train, thereby to supply to the respective switch outputs digit signals in accordance with the stored sign digit signal during the first $k$ calculating pulses of the calculating pulse train and to supply to the respective switch outputs digit signals from the calculating unit input during the remaining $N$ minus $k$ calculating pulses of the calculating pulse train.

8. A calculating unit according to claim 7 with said switches representing respective binary one multiplier digits of a plurality of binary multipliers including binary one multiplier digits of a common digit value, having respective calculating unit outputs for supplying the products of the multiplicand and the respective binary multipliers, and having respective multiplier branches each interposed between the switch outputs of the respective switches representing a respective multiplier and the corresponding respective calculating unit output, the switch output of the switch representing the common digit value being connected to each of the respective multiplier branches.

9. A calculating unit according to claim 7 with said switches representing binary one multiplier digits of a plurality of respective common digit binary multipliers, such common digit binary multipliers having identical consecutive binary digits from a highest order digit value to a certain lower order binary digit value, one of said switches representing a binary one multiplier digit for the next lower order binary digit value next lower than said certain lower order binary digit value for one only of said common digit binary multipliers, the shift register having a common chain of storage cells including a certain storage cell corresponding to said certain lower order binary digit value, and having respective multiplier branches with respective branch inputs connected in common to an output of said certain storage cell, and one only of such multiplier branches having a further input connected to the switch output of said one of said switches.

10. A calculating unit according to claim 7 with said adder being interposed in the series of storage cells between an rth storage cell and an $(r+l)$th storage cell of said series, and having a carry store for receiving carry signals from the adder, said carry store being connected with said sign register and being responsive to a rounding control pulse which occurs with the arrival of the rth calculating pulse and to a positive sign digit signal stored in said sign register to store a rounding digit signal in place of any carry signal from said adder, thereby to reduce rounding errors.

11. A calculating unit according to claim 7 with each storage cell forming part of an individual module, the modules with the respective storage cells forming part thereof having module input means and module output means for connection of the modules in a series to provide the series of storage cells, each module including an adder circuit having first and second inputs and an output, and connectable by means of its first input and its output in series with the associated storage cell between the module input and output means, such that said adder is provided by the corresponding adder circuit of the module of the corresponding position in the series of modules and such corresponding adder circuit being connected in series with the associated storage cell between the associated module input and output means, and each module including a switch circuit having a first input for connection to said calculating unit input, a second input for connection to the sign register, and a third input for receiving the switch control pulse trains, and having its output connected to the second input of the associated adder circuit of the module.

12. A calculating unit according to claim 11 with the adder circuits of the respective modules having respective carry outputs and respective third inputs, and each module having a carry store circuit with a carry store input connected to the carry output of the associated adder circuit and with a carry store output connected to the third input of the associated adder circuit, the carry store circuits having a first input logic circuit for connection to said sign register and to said calculating unit input for supplying a rounding digit signal when a positive sign digit signal is stored in said sign register, and having a second input logic circuit for receiving a rounding control pulse and for blocking storage of a carry pulse from the adder circuit and for causing storage of a rounding digit signal in said carry store circuit in response to the occurrence of the rounding control pulse with a positive sign digit signal supplied to said first control input circuit, the module having its adder circuit interposed in the series of storage cells between an rth storage cell and an $(r+1)$th storage cell of said series, having its carry store circuit responsive to a rounding control pulse which occurs with the arrival of the rth calculating pulse and to a positive sign digit signal stored in said sign register to store a rounding digit signal in place of any carry signal from the associated adder circuit, thereby to reduce rounding errors.

13. A calculating unit according to claim 7 with said calculating unit input being connected in common to the shift register and to the sign register for supplying successive digit signals of the multiplicand including a sign digit signal both to the shift register and to the sign register and the sign register being responsive to a pulse train synchronized with the arrival of the sign digit signal at said calculating unit input to store the sign digit signal.

14. A calculating unit in accordance with claim 7 with said shift register containing N minus m storage cells where the switch representing the first binary one of the multiplier after the binary point is connected to the mth storage cell of said series of storage cells.

15. A calculating unit in accordance with claim 7 with said calculating unit input receiving successive binary digit signals of the multiplicand in sequence from that corresponding to the least significant bit to that corresponding to the most significant bit and then receiving the sign digit signal, and said calculating unit output being operable to supply successive binary digit signals corresponding to successively higher order bits of the product of said multiplicand and said multiplier.

16. A calculating unit for the serial multiplication of a binary multiplicand and a binary multiplier, comprising a calculating unit input for receiving successive digit signals representing successive digits of a binary multiplicand and a sign digit signal representing the sign of the multiplicand, a calculating unit output for supplying the successive digit signals representing the product of the multiplicand and a binary multiplier, a shift register connected with the calculating unit input and having a series of storage cells into which the successive digit signals are fed in serial fashion, and responsive to successive calculating pulses of a calculating pulse train to shift the successive digit signals through said series of storage cells during a multiplication cycle, a sign register to which the digit signal representing the sign digit of the multiplicand is supplied, an adder operatively connected with said shift register and responsive to the successive calculating pulses of the calculating pulse train to additively combine respective digit signals, and a series of individually operable change-over switches each representing a respective binary one multiplier digit of the multiplier, and operatively connected with said shift register, said adder and said sign register for controlling the processing of successive digit signals during the transmission thereof between said calculating unit input and said calculating unit output to effect the multiplication of said multiplicand and said multiplier, said switches each being operatively associated with a respective one of said storage cells of said series of storage cells in accordance with the digit value of the binary one multiplier digit represented thereby and each switch being controlled by a respective switch control pulse train which initiates a change-over in each multiplication cycle in accordance with the digit value of the binary one multiplier digit represented by the switch.

17. A calculating unit according to claim 16 with the calculating unit input receiving said digit signals representing successive digits of the multiplicand in a sequence from that corresponding to the least significant bit to that representing the most significant bit of the multiplicand followed by the sign digit signal, and said calculating unit output supplying the successive digit signals in the sequence from that representing the least significant bit to that representing the most significant bit of the product.

18. A calculating unit in accordance with claim 16 characterized in that the shift register contains $N$ minus $m$ storage cells where the switch representing the first binary 1 of the multiplier after the binary point is connected with the $m$th storage cell of said series.

* * * * *